J. ARMSTRONG.
Rotary Harrow.

No. 79,540.

Patented July 7, 1868.

Witnesses.
Geo Keller

Inventor.
James Armstrong

United States Patent Office.

JAMES ARMSTRONG, OF BUCYRUS, OHIO.

Letters Patent No. 79,540, dated July 7, 1868.

GARDEN-IMPLEMENT.

The Schedule referred to in these Letters Patent and making part of the same.

TO ALL WHOM IT MAY CONCERN:

Be it known that I, JAMES ARMSTRONG, of Bucyrus, in the county of Crawford, and State of Ohio, have invented a new and useful implement for hand-use in the garden, a Pulverizer and Cultivator and Rake combined; and I do hereby declare that the following is a full, clear, and exact description thereof, reference being had to the accompanying drawings, making a part of this specification, in which—

Figure 1:
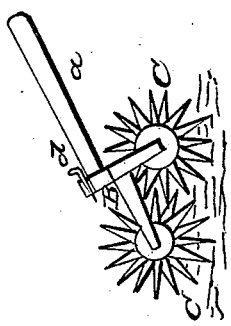
Figure 4:
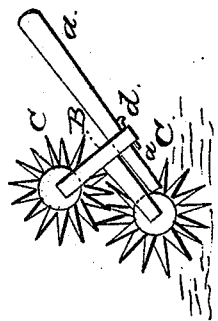
Figure 2:
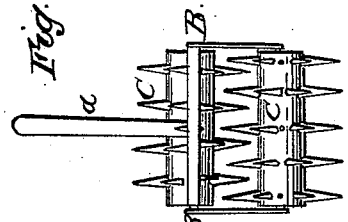
Figure 3:
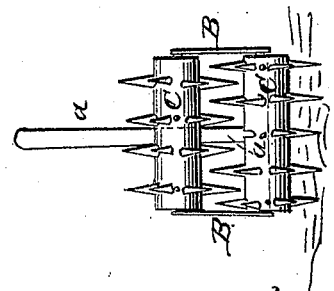

Figure 1 is a top view of implement.
Figure 2 is an end view of implement.
Figure 3 is a back view of implement, when used as a rake.
Figure 4 is an end view of implement, when used as a rake.

Similar letters of reference indicate corresponding parts in the several figures.

This invention relates to certain novel and useful improvements for pulverizing the ground and cultivating vegetables.

To enable others skilled in the art to make and use my invention, I will describe its construction and operation.

It is constructed with two rollers C C, with gudgeons or pivots in each end. The rollers are held by iron frame B B, in horizontal position, so as to allow the rollers to revolve when the implement is moved back and forth in the ground. Teeth are set in rollers so as to extend out three or four inches. Rollers C C are held by frame B, so that the outer points of the teeth will clear the corresponding roller. The thickness of rollers should not exceed two inches. The space between the teeth, lengthwise of the rollers, should not exceed two inches, and about eight teeth in each circle on circumference of each roller. The handle $a$ enters an eye in frame B, and is held by wedge $d$, and when used as a rake, the handle $a$ is placed through the eye in frame B, so as to lock the lower roller, by coming in contact with the teeth in lower roller; this change forms a rake.

This implement, as a whole, is formed of two rollers, held by frame B, as herein described, moved by handle $a$. The teeth in the rollers pass each other in opposite directions, when the implement is in operation in the ground, so that the ground, as it passes between the teeth, is crushed, and left loose and mellow. When used as a rake, the teeth will strike the ground at any angle or elevation of the handle.

What I claim as new in my invention, and desire to secure by Letters Patent, is—

The sliding of the handle A through the eye of the frame B, so as to lock the lower roller C, by coming in contact with the teeth of said lower roller, in combination with all the other devices aforesaid, as herein described for the purposes set forth.

JAMES ARMSTRONG.

Witnesses:
GEO. KELLER,
FRANK ADAMS.